(12) United States Patent
Zhang

(10) Patent No.: US 9,030,626 B2
(45) Date of Patent: May 12, 2015

(54) LIQUID CRYSTAL DISPLAY DEVICE

(71) Applicant: Shenzhen China Star Optoelectronics Technology Co., Ltd., Shenzhen, Guangdong Province (CN)

(72) Inventor: Yanxue Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 185 days.

(21) Appl. No.: 13/806,773

(22) PCT Filed: Nov. 20, 2012

(86) PCT No.: PCT/CN2012/084855
§ 371 (c)(1),
(2) Date: Dec. 22, 2012

(87) PCT Pub. No.: WO2014/075321
PCT Pub. Date: May 22, 2014

(65) Prior Publication Data
US 2014/0132878 A1 May 15, 2014

(30) Foreign Application Priority Data

Nov. 14, 2012 (CN) .......................... 2012 1 0457719

(51) Int. Cl.
*G02F 1/1333* (2006.01)
*G06F 1/16* (2006.01)

(52) U.S. Cl.
CPC ........ *G02F 1/133308* (2013.01); *G06F 1/1601* (2013.01); *G02F 2001/13332* (2013.01); *G02F 2201/46* (2013.01); *G02F 2202/22* (2013.01)

(58) Field of Classification Search
USPC ............................................... 349/58
See application file for complete search history.

(56) References Cited

U.S. PATENT DOCUMENTS

| 6,741,299 | B2 * | 5/2004 | Fukayama et al. | 349/58 |
| 7,113,237 | B2 * | 9/2006 | Nitto et al. | 349/58 |
| 7,528,899 | B2 * | 5/2009 | Cho | 349/59 |

FOREIGN PATENT DOCUMENTS

| CN | 1423153 A | 6/2003 |
| CN | 101101392 A | 1/2008 |
| CN | 101153966 A | 4/2008 |
| CN | 102566106 A | 7/2012 |
| CN | 102608795 A | 7/2012 |
| CN | 102749730 A | 10/2012 |
| JP | 2004-29663 A | 1/2004 |

* cited by examiner

*Primary Examiner* — James Dudek
(74) *Attorney, Agent, or Firm* — Cheng-Ju Chiang

(57) ABSTRACT

The present invention provides a liquid crystal display device, which includes a backlight module, a mold frame arranged on the backlight module, a liquid crystal display panel arranged on the mold frame, a front enclosure made of a plastic material and arranged on the liquid crystal display panel, and a conductor piece mounted on the front enclosure. The backlight module includes a backplane made of a conductive materiel, a backlight source mounted in the backplane, and an optic film assembly received in the backplane. The conductor piece includes a first conductive section to which a second conductive section is connected. The first conductive section is arranged between the front enclosure and the liquid crystal display panel to engage the liquid crystal display panel. A bolt is received through the second conductive section of the conductor piece, the front enclosure, and the mold frame to engage and fix to the backplane.

10 Claims, 4 Drawing Sheets

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel pieces of glass and the liquid crystal molecules are controlled to change direction by application of electricity to the glass substrates in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby form a planar light source for the liquid crystal panel.

Referring to FIG. 1, a liquid crystal display device generally comprises a backlight module 100, a mold frame 300 arranged on the backlight module 100, a liquid crystal display panel 500 arranged on the mold frame 300, and a front enclosure 700 arranged on the liquid crystal display panel 500. The backlight module 100 comprises a backplane 102, an optic film assembly 104 received in the backplane 102, and a backlight source (not shown) mounted in the backplane 102. The backlight module 100 provides the liquid crystal display panel 500 with a planar light source of homogenous illumination. The mold frame 300 supports the liquid crystal display panel 500 and the front enclosure 700 retains the liquid crystal display panel 500 in the mold frame 300. The liquid crystal display panel 500 comprises a TFT (Thin-Film Transistor) substrate 502, a CF (Color Filter) substrate 504 that is set opposite to and laminated on the TFT substrate 502, and liquid crystal (not shown) interposed between the TFT substrate 502 and the CF substrate 504. The TFT substrate 502 is laminated on the CF substrate 504 in such a way that a stepped site 524 is formed at an edge of the TFT substrate 502. The stepped site 524 functions to receive a flexible circuit board (such as chip-on-flex, COF) 526 thereon for supplying a drive voltage to the liquid crystal display panel 500.

The front enclosure 700 is generally made of plastics for cost control purposes. The backplane 102 is generally made of metals, such as steel, to ensure strength of the backlight module 100. A liquid crystal display device of such a structure is susceptible to being not able to release static electricity generated by the flexible circuit board 526, resulting in the risk of electrostatics breakthrough of the flexible circuit board 526 and integrated circuits (not shown) and thus affecting the quality of the liquid crystal display device.

To cope with the problem, Chinese Patent Application (No. 201210068995.6) discloses a liquid crystal display device (as shown in FIG. 2), which comprises, sequentially from outer side to inner side, a front enclosure 100', a mold frame 300', and a backplane 500' that are combined with each other. The front enclosure 100' and the mold frame 300' interpose therebetween a liquid crystal panel 700'. The front enclosure 100' is made of an insulation material and a conductive film 102' is arranged on a surface of the front enclosure 100'. The backplane 500' is made of a conductive material and a conductor piece 502' is provided between the conductive film 102' and the backplane 500', so that the conductive film 102' is electrically connected, via the conductor piece 502', to the backplane 500'. This arrangement uses the connection between the conductive film 102' and the backplane 500' that is made of a conductive material established with the conductor piece 502' so that static electricity generated by a flexible circuit board (not shown) is discharged through the conductive film 102' to the backplane 500' to effectively protect the circuit board and integrated circuits from electrostatic breakthrough.

This solution effectively handles the issue of releasing static electricity but suffers the following drawbacks:

(1) The conductor piece that connects the front enclosure with the backplane lowers down the cost advantage of the plastics-made front enclosure.

(2) Bonding the conductor piece causes a waste of labor cost.

(3) The bonded conductor piece may get inadvertently detached and quality problems may result.

SUMMARY OF THE INVENTION

An object of the present invention is to provide a liquid crystal display device, which can effectively release static electricity, has an extended lifespan, has a simple structure, is easy to assemble, and is advantageous for cost control.

To achieve the above object, the present invention provides a liquid crystal display device, which comprises a backlight module, a mold frame arranged on the backlight module, a liquid crystal display panel arranged on the mold frame, a front enclosure arranged on the liquid crystal display panel, and a conductor piece mounted on the front enclosure. The backlight module comprises a backplane, a backlight source mounted in the backplane, and an optic film assembly received in the backplane. The backplane is made of a conductive materiel. The front enclosure is made of a plastic material. The conductor piece comprises a first conductive section and a second conductive section connected to the first conductive section. The first conductive section is arranged between the front enclosure and the liquid crystal display panel to engage the liquid crystal display panel. A bolt is received through the second conductive section of the conductor piece, the front enclosure, and the mold frame to engage and fix to the backplane.

The backplane comprises a bottom board and a plurality of side boards perpendicularly connected to the bottom board. At least one of the side boards has a free end forming a coupling tab perpendicularly connected to the one of the side boards. The coupling tab forms a threaded hole. The front enclosure forms a first through hole corresponding to the threaded hole. The second conductive section of the conductor piece forms a second through hole corresponding to the first through hole. The mold frame forms a third through hole corresponding to the threaded hole. The bolt is sequentially received through the second through hole, the first through hole, and the third through hole to engage and fix in the threaded hole.

The front enclosure comprises top board forming an opening and the first conductive section and the second conductive section of the conductor form a U-shaped channel. The conductor piece is coupled to the top board by the U-shaped channel. The first conductive section is mounted at an inner side of the top board to electrically engage the liquid crystal display panel. The second conductive section is arranged at an outer side of the top board to be electrically connected to the backplane by the bolt.

The first conductive section is an elongate metal strip, while the second conductive section comprises two plate-like metal arms formed at opposite ends of the first conductive section.

The liquid crystal display panel comprises a TFT substrate, a CF substrate opposite to and laminated on the TFT substrate, and liquid crystal interposed between the TFT substrate and the CF substrate. The TFT substrate and the CF substrate are laminated to each other in such a way that a stepped site is formed at an edge of the CF substrate. A flexible circuit board is bonded to the stepped site. The flexible circuit board supplies a drive voltage to the liquid crystal display panel. The liquid crystal display panel further comprises a first polarizer laminated on a surface of the TFT substrate that is distant from the CF substrate and a second polarizer laminated to a surface of the CF substrate that is distant from the TFT substrate.

The mold frame is made of a plastic material.

The conductor piece is made of aluminum.

The optic film assembly comprises a light guide plate, a reflector plate mounted to a surface of the light guide plate that opposes the backplane, and a brightness enhancement film mounted to an opposite surface of the light guide plate.

The optic film assembly comprises a diffusion plate and a brightness enhancement film mounted to a surface of the diffusion plate that is distant from the backplane.

The liquid crystal display device further comprises a rear enclosure that mates the front enclosure.

The present invention also provides a liquid crystal display device, which comprises a backlight module, a mold frame arranged on the backlight module, a liquid crystal display panel arranged on the mold frame, a front enclosure arranged on the liquid crystal display panel, and a conductor piece mounted on the front enclosure, the backlight module comprising a backplane, a backlight source mounted in the backplane, and an optic film assembly received in the backplane, the backplane being made of a conductive materiel, the front enclosure being made of a plastic material, the conductor piece comprising a first conductive section and a second conductive section connected to the first conductive section, the first conductive section being arranged between the front enclosure and the liquid crystal display panel to engage the liquid crystal display panel, a bolt being received through the second conductive section of the conductor piece, the front enclosure, and the mold frame to engage and fix to the backplane;

wherein the backplane comprises a bottom board and a plurality of side boards perpendicularly connected to the bottom board, at least one of the side boards having a free end forming a coupling tab perpendicularly connected to said one of the side boards, the coupling tab forming a threaded hole, the front enclosure forming a first through hole corresponding to the threaded hole, the second conductive section of the conductor piece forming a second through hole corresponding to the first through hole, the mold frame forming a third through hole corresponding to the threaded hole, the bolt being sequentially received through the second through hole, the first through hole, and the third through hole to engage and fix in the threaded hole;

wherein the front enclosure comprises top board forming an opening and the first conductive section and the second conductive section of the conductor form a U-shaped channel, the conductor piece being coupled to the top board by the U-shaped channel, the first conductive section being mounted at an inner side of the top board to electrically engage the liquid crystal display panel, the second conductive section being arranged at an outer side of the top board to be electrically connected to the backplane by the bolt;

wherein the first conductive section is an elongate metal strip, while the second conductive section comprises two plate-like metal arms formed at opposite ends of the first conductive section;

wherein the liquid crystal display panel comprises a TFT substrate, a CF substrate opposite to and laminated on the TFT substrate, and liquid crystal interposed between the TFT substrate and the CF substrate, the TFT substrate and the CF substrate being laminated to each other in such a way that a stepped site is formed at an edge of the CF substrate, a flexible circuit board being bonded to the stepped site, the flexible circuit board supplying a drive voltage to the liquid crystal display panel, the liquid crystal display panel further comprising a first polarizer laminated on a surface of the TFT substrate that is distant from the CF substrate and a second polarizer laminated to a surface of the CF substrate that is distant from the TFT substrate;

wherein the mold frame is made of a plastic material;

wherein the conductor piece is made of aluminum;

wherein the optic film assembly comprises a light guide plate, a reflector plate mounted to a surface of the light guide plate that opposes the backplane, and a brightness enhancement film mounted to an opposite surface of the light guide plate; and further comprising a rear enclosure that mates the front enclosure.

The efficacy of the present invention is that the liquid crystal display device according to the present invention comprises a conductor piece mounted to a front enclosure in such a way that a first conductive section of the conductor piece is in electrical engagement with a liquid crystal display panel and a second conductive section of the conductor piece is electrically connected to a backplane by a bolt so as to form an electric path for effectively releasing static electricity and preventing static electricity from breaking through a flexible circuit board and integrated circuits to extend the lifespan of the liquid crystal display device. In addition, the structure is simple, the assembling is easy, and the manufacturing cost can be effectively reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
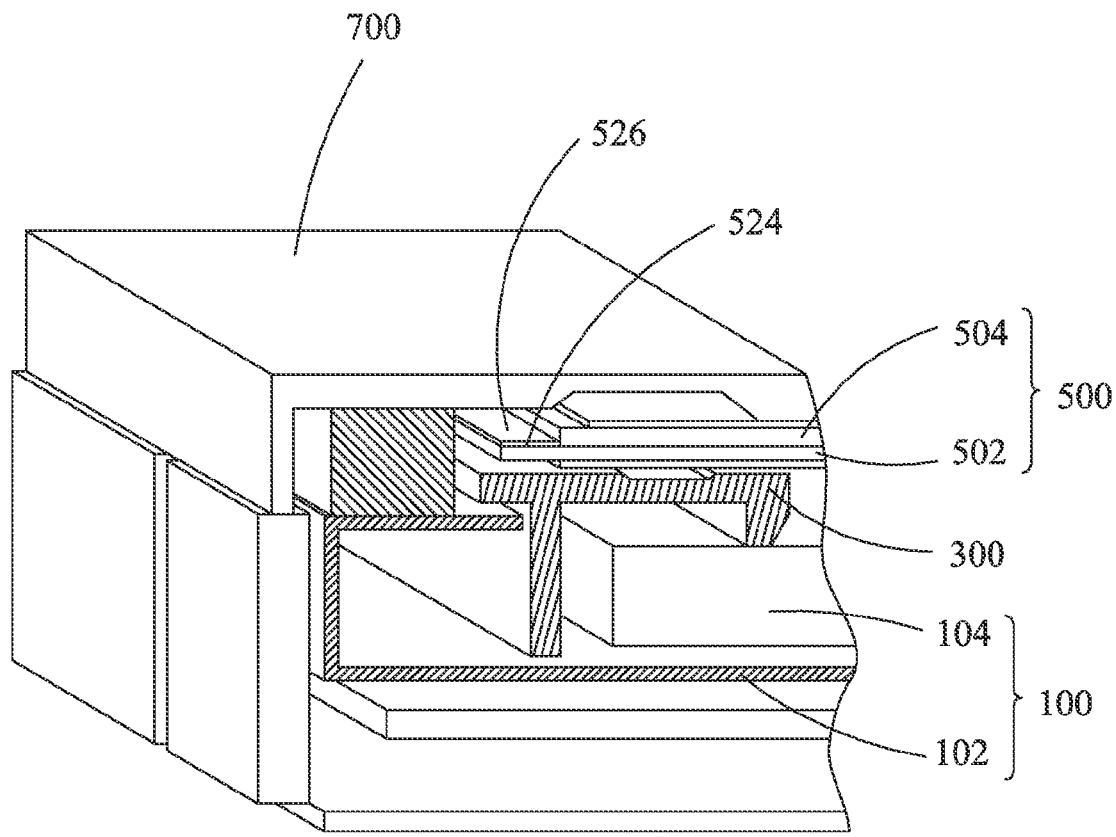
FIG. 1 is a schematic view showing the structure of a conventional liquid crystal display device.
Figure 2:
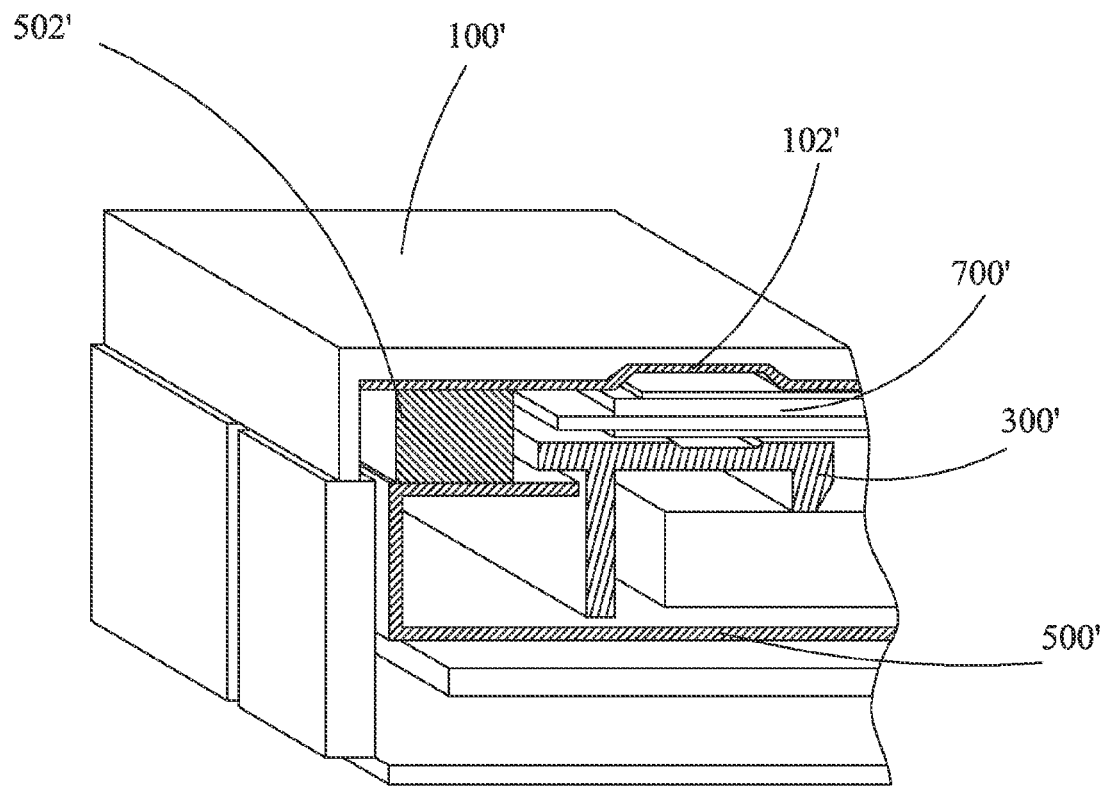
FIG. 2 is a schematic view showing the structure of another conventional liquid crystal display device.
Figure 3:
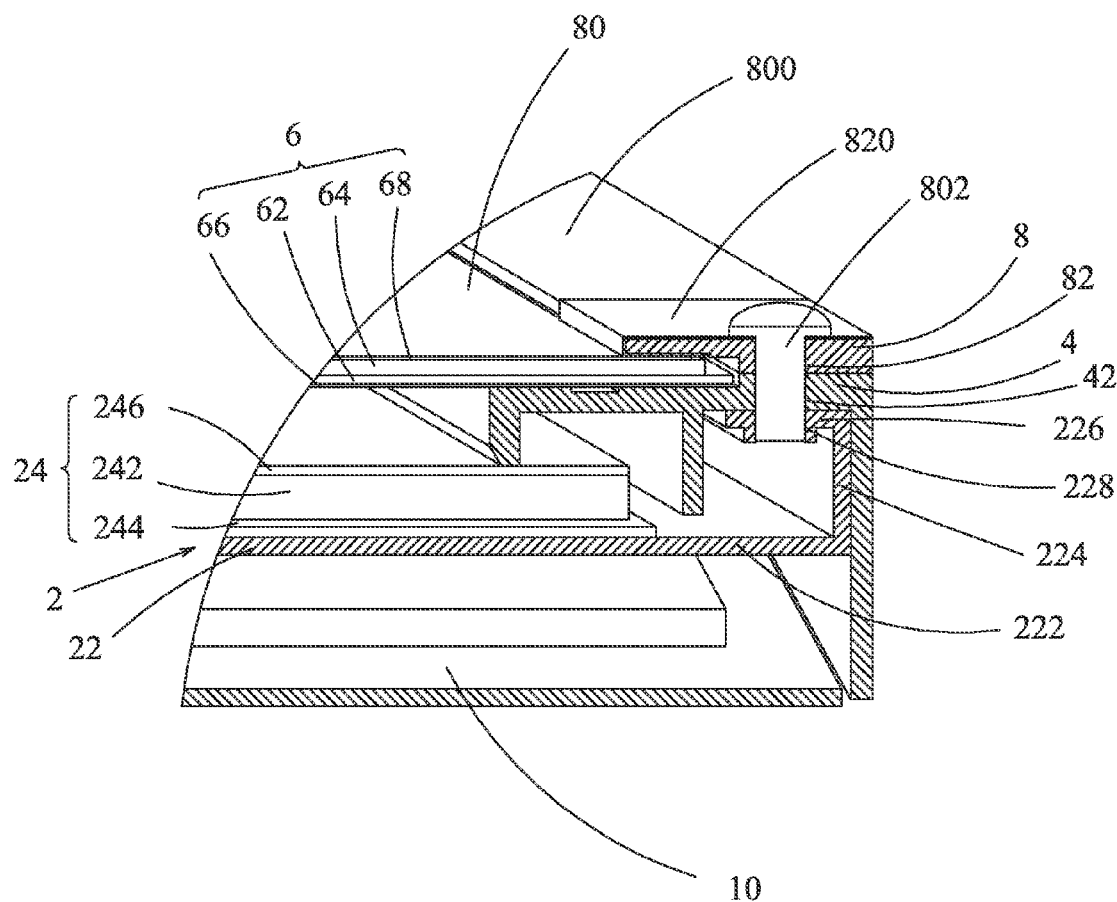
FIG. 3 is a schematic view showing the structure of a liquid crystal display device according to the present invention.
Figure 4:
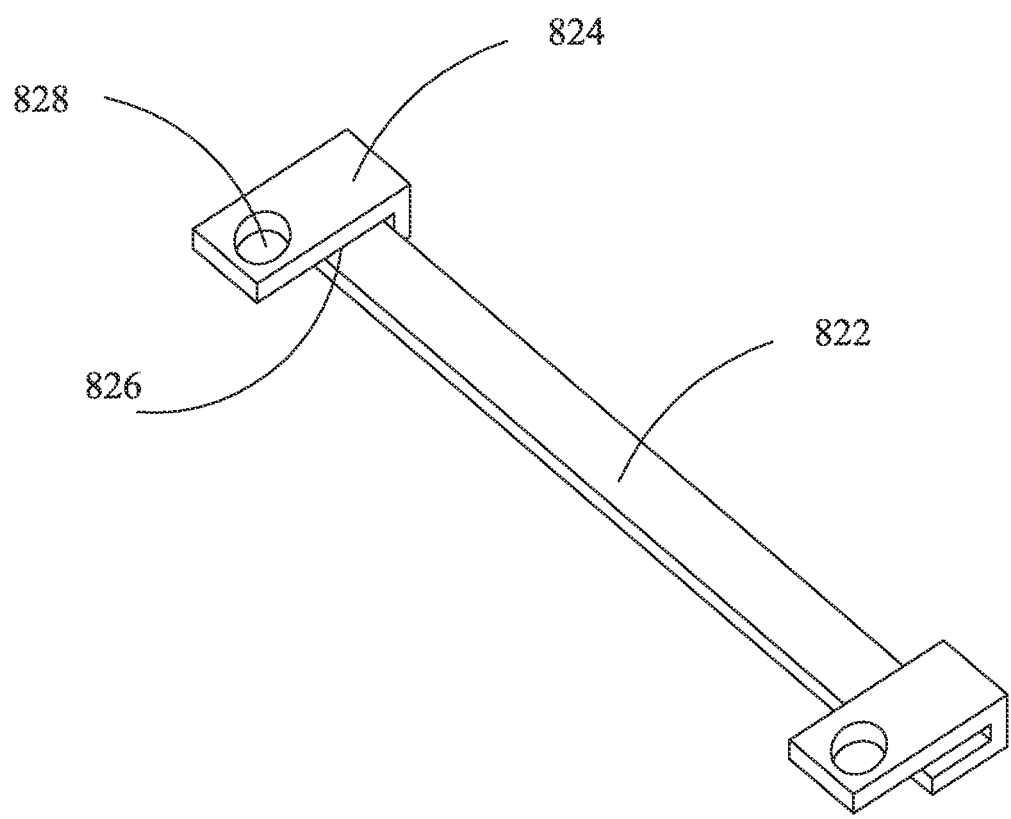
FIG. 4 is schematic view showing the structure of a conductor piece according to the present invention.

Referring to FIGS. 3 and 4, the present invention provides a liquid crystal display device, which comprises a backlight module 2, a mold frame 4 arranged on the backlight module 2, a liquid crystal display panel 6 arranged on the mold frame 4, a front enclosure 8 arranged on the liquid crystal display panel 6, and a conductor piece 820 mounted on the front enclosure 8.

The backlight module 2 comprises a backplane 22, a backlight source (not shown) mounted in the backplane 22, and an optic film assembly 24 received in the backplane 22.

The backplane 22 is made of a conductive material and comprises a bottom board 222 and a plurality of side boards 224 perpendicularly connected to the bottom board 222. At least one of the side boards 224 has a free end forming a coupling tab 226 perpendicularly connected to said one of the side boards 224. The coupling tab 226 forms a threaded hole 228.

The front enclosure 8 is made of a plastic material and comprises top board 800 forming an opening 80. The top board 800 forms a first through hole 82 corresponding to the threaded hole 228. The front enclosure 8 is fixed to the backplane 22 by a bolt 802.

The conductor piece 820 is mounted to the front enclosure 8. The conductor piece 820 comprises a first conductive section 822 and at least one second conductive section 824 connected to the first conductive section 822. The first conductive section 822 is mounted inside the front enclosure 8 to electrically engage the liquid crystal display panel 6 and the second conductive section 824 is electrically connected to the backplane 22 by a bolt 802 to form an electrical path for releasing static electricity and thus effectively preventing electrostatic breakthrough of a flexible circuit board (not shown) and integrated circuits (not shown).

Preferably, the conductor piece 820 is an electrically conductive metal piece made of aluminum. In the instant embodiment, the first conductive section 822 is an elongate metal strip, while the second conductive section 824 comprises two plate-like metal arms formed at opposite ends of the first conductive section 822. The first conductive section 822 and the second conductive section 824 form a U-shaped channel 826. The conductor piece 820 is coupled to the top board 800 by the U-shaped channel 826. The first conductive section 822 is mounted at an inner side of the top board 800 of the front enclosure 8 to electrically engage the liquid crystal display panel 6, while the second conductive section 824 is arranged at an outer side of the top board 800 of the front enclosure 8 to be electrically connected to the backplane 22 by the bolt 802. The second conductive section 824 of the conductor piece 820 forms a second through hole 828 corresponding to the first through hole 82. The bolt 802 is put sequentially through the second through hole 828 and the first through hole 82 to engage and fix in the threaded hole 228.

The mold frame 4 is made of a plastic material to bear the liquid crystal display panel 6 thereon and forms a third through hole 42 corresponding to the first through hole 82. The bolt 802 is received, sequentially, through the second through hole 828 of the second conductive section 824, the first through hole 82 of the front enclosure 8, and the third through hole 42 of the mold frame 4 to engage and fix in the threaded hole 228.

The liquid crystal display panel 6 comprises a TFT (Thin-Film Transistor) substrate 62, a CF (Color Filter) substrate 64 opposite to and laminated on the TFT substrate 62, and liquid crystal (not shown) interposed between the TFT substrate 62 and the CF substrate 64.

The TFT substrate 62 and the CF substrate 64 are laminated to each other in such a way that a stepped site 642 is formed at an edge of the CF substrate 64. A flexible circuit board (not shown) is bonded to the stepped site 642. The flexible circuit board provides a drive voltage to the liquid crystal display panel 6 to drive liquid crystal molecules for effecting displaying of images.

The liquid crystal display panel 6 further comprises a first polarizer 66 that is laminated on a surface of the TFT substrate 62 that is distant from the CF substrate 64 and a second polarizer 68 laminated to a surface of the CF substrate 64 that is distant from the TFT substrate 62.

In the instant embodiment, the backlight module 2 is a side-edge backlight module. The optic film assembly 24 comprises a light guide plate 242, a reflector plate 244 mounted to a surface of the light guide plate 242 that opposes the backplane 22, and a brightness enhancement film 246 mounted to an opposite surface of the light guide plate 242.

The liquid crystal display device of the present invention further comprises a rear enclosure 10 that mates the front enclosure 8. In the instant embodiment, the front enclosure 8 is coupled to the rear enclosure 10 through snap fitting to thereby retain the backlight module 2, the mold frame 4, and the liquid crystal display panel 6 between the front enclosure 8 and the rear enclosure 10 to form the liquid crystal display device.

The backlight module of the present invention can be alternatively a direct backlight module (not shown). When the backlight module is a direct backlight module, the optic film assembly comprises a diffusion plate and a brightness enhancement film mounted to a surface of the diffusion plate that is distant from the backplane.

In summary, the liquid crystal display device according to the present invention comprises a conductor piece mounted to a front enclosure in such a way that a first conductive section of the conductor piece is in electrical engagement with a liquid crystal display panel and a second conductive section of the conductor piece is electrically connected to a backplane by a bolt so as to form an electric path for effectively releasing static electricity and preventing static electricity from breaking through a flexible circuit board and integrated circuits to extend the lifespan of the liquid crystal display device. In addition, the structure is simple, the assembling is easy, and the manufacturing cost can be effectively reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising a backlight module, a mold frame arranged on the backlight module, a liquid crystal display panel arranged on the mold frame, a front enclosure arranged on the liquid crystal display panel, and a conductor piece mounted on the front enclosure, the backlight module comprising a backplane, a backlight source mounted in the backplane, and an optic film assembly received in the backplane, the backplane being made of a conductive materiel, the front enclosure being made of a plastic material, the conductor piece comprising a first conductive section and a second conductive section connected to the first conductive section, the first conductive section being arranged between the front enclosure and the liquid crystal display panel to engage the liquid crystal display panel, a bolt being received through the second conductive section of the conductor piece, the front enclosure, and the mold frame to engage and fix to the backplane;
   wherein the backplane comprises a bottom board and a plurality of side boards perpendicularly connected to the bottom board, at least one of the side boards having a free end forming a coupling tab perpendicularly connected to said one of the side boards, the coupling tab forming a threaded hole, the front enclosure forming a first through hole corresponding to the threaded hole, the second conductive section of the conductor piece forming a second through hole corresponding to the first through hole, the mold frame forming a third through hole corresponding to the threaded hole, the bolt being sequentially received through the second through hole, the first through hole, and the third through hole to engage and fix in the threaded hole.

2. The liquid crystal display device as claimed in claim 1, wherein the front enclosure comprises a top board forming an opening and the first conductive section and the second conductive section of the conductor piece form a U-shaped channel, the conductor piece being coupled to the top board by the U-shaped channel, the first conductive section being mounted at an inner side of the top board to electrically engage the liquid crystal display panel, the second conductive section being arranged at an outer side of the top board to be electrically connected to the backplane by the bolt.

3. The liquid crystal display device as claimed in claim 2, wherein the first conductive section is an elongate metal strip, while the second conductive section comprises two plate-like metal arms formed at opposite ends of the first conductive section.

4. The liquid crystal display device as claimed in claim 1, wherein the liquid crystal display panel comprises a thin-film transistor (TFT) substrate, a color filter (CF) substrate opposite to and laminated on the TFT substrate, and liquid crystal interposed between the TFT substrate and the CF substrate, the TFT substrate and the CF substrate being laminated to each other in such a way that a stepped site is formed at an edge of the CF substrate, a flexible circuit board being bonded to the stepped site, the flexible circuit board supplying a drive voltage to the liquid crystal display panel, the liquid crystal display panel further comprising a first polarizer laminated on a surface of the TFT substrate that is distant from the CF substrate and a second polarizer laminated to a surface of the CF substrate that is distant from the TFT substrate.

5. The liquid crystal display device as claimed in claim 1, wherein the mold frame is made of a plastic material.

6. The liquid crystal display device as claimed in claim 1, wherein the conductor piece is made of aluminum.

7. The liquid crystal display device as claimed in claim 1, wherein the optic film assembly comprises a light guide plate, a reflector plate mounted to a surface of the light guide plate that opposes the backplane, and a brightness enhancement film mounted to an opposite surface of the light guide plate.

8. The liquid crystal display device as claimed in claim 1, wherein the optic film assembly comprises a diffusion plate and a brightness enhancement film mounted to a surface of the diffusion plate that is distant from the backplane.

9. The liquid crystal display device as claimed in claim 1, further comprising a rear enclosure that mates the front enclosure.

10. A liquid crystal display device, comprising a backlight module, a mold frame arranged on the backlight module, a liquid crystal display panel arranged on the mold frame, a front enclosure arranged on the liquid crystal display panel, and a conductor piece mounted on the front enclosure, the backlight module comprising a backplane, a backlight source mounted in the backplane, and an optic film assembly received in the backplane, the backplane being made of a conductive materiel, the front enclosure being made of a plastic material, the conductor piece comprising a first conductive section and a second conductive section connected to the first conductive section, the first conductive section being arranged between the front enclosure and the liquid crystal display panel to engage the liquid crystal display panel, a bolt being received through the second conductive section of the conductor piece, the front enclosure, and the mold frame to engage and fix to the backplane;
   wherein the backplane comprises a bottom board and a plurality of side boards perpendicularly connected to the bottom board, at least one of the side boards having a free end forming a coupling tab perpendicularly connected to said one of the side boards, the coupling tab forming a threaded hole, the front enclosure forming a first through hole corresponding to the threaded hole, the second conductive section of the conductor piece forming a second through hole corresponding to the first through hole, the mold frame forming a third through hole corresponding to the threaded hole, the bolt being sequentially received through the second through hole, the first through hole, and the third through hole to engage and fix in the threaded hole;
   wherein the front enclosure comprises a top board forming an opening and the first conductive section and the second conductive section of the conductor piece form a U-shaped channel, the conductor piece being coupled to the top board by the U-shaped channel, the first conductive section being mounted at an inner side of the top board to electrically engage the liquid crystal display panel, the second conductive section being arranged at an outer side of the top board to be electrically connected to the backplane by the bolt;
   wherein the first conductive section is an elongate metal strip, while the second conductive section comprises two plate-like metal arms formed at opposite ends of the first conductive section;
   wherein the liquid crystal display panel comprises a thin film transistor (TFT) substrate, a color filter (CF) substrate opposite to and laminated on the TFT substrate, and liquid crystal interposed between the TFT substrate and the CF substrate, the TFT substrate and the CF substrate being laminated to each other in such a way that a stepped site is formed at an edge of the CF substrate, a flexible circuit board being bonded to the stepped site, the flexible circuit board supplying a drive voltage to the liquid crystal display panel, the liquid crystal display panel further comprising a first polarizer laminated on a surface of the TFT substrate that is distant from the CF substrate and a second polarizer laminated to a surface of the CF substrate that is distant from the TFT substrate;

wherein the mold frame is made of a plastic material;

wherein the conductor piece is made of aluminum;

wherein the optic film assembly comprises a light guide plate, a reflector plate mounted to a surface of the light guide plate that opposes the backplane, and a brightness enhancement film mounted to an opposite surface of the light guide plate; and further comprising a rear enclosure that mates the front enclosure.

* * * * *